(12) United States Patent
Kifune et al.

(10) Patent No.: US 11,296,352 B2
(45) Date of Patent: Apr. 5, 2022

(54) SECONDARY BATTERY

(71) Applicant: VEHICLE ENERGY JAPAN INC., Hitachinaka (JP)

(72) Inventors: Motonari Kifune, Hitachinaka (JP); Tetsuya Horinohchi, Hitachinaka (JP); Kazuhide Uemura, Hitachinaka (JP); Mutsumi Tsujide, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 117 days.

(21) Appl. No.: 16/626,709

(22) PCT Filed: Mar. 16, 2018

(86) PCT No.: PCT/JP2018/010512
§ 371 (c)(1),
(2) Date: Dec. 26, 2019

(87) PCT Pub. No.: WO2019/038970
PCT Pub. Date: Feb. 28, 2019

(65) Prior Publication Data
US 2020/0144657 A1 May 7, 2020

(30) Foreign Application Priority Data

Aug. 24, 2017 (JP) .............................. JP2017-161305

(51) Int. Cl.
*H01M 10/04* (2006.01)
*H01M 10/0525* (2010.01)

(52) U.S. Cl.
CPC ..... *H01M 10/0459* (2013.01); *H01M 10/049* (2013.01); *H01M 10/0525* (2013.01)

(58) Field of Classification Search
CPC ........... H01M 10/0459; H01M 10/049; H01M 10/0525; H01M 10/0587; H01M 4/13
See application file for complete search history.

(56) References Cited

U.S. PATENT DOCUMENTS

2006/0199294 A1 9/2006 Fujikawa
2018/0351211 A1 12/2018 Kifune

FOREIGN PATENT DOCUMENTS

EP 3 578 272 A1 12/2019
JP 2006-048942 A 2/2006
(Continued)

OTHER PUBLICATIONS

Machine translation of WO 2017130821 A, Motonari Kifune, Secondary Battery and Manufacturing thereof (Year: 2017).*
(Continued)

*Primary Examiner* — Maria Laios
*Assistant Examiner* — Bartholomew A Hornsby
(74) *Attorney, Agent, or Firm* — Foley & Lardner LLP

(57) ABSTRACT

An object of the present invention is to obtain a secondary battery that allows grasping a position of a mixture layer on an electrode and facilitates adjustment of positions of a positive electrode and a negative electrode. A secondary battery (100) of the present invention includes a negative electrode (32) that includes a strip-shaped copper foil (45) having both surfaces, negative electrode mixture layers (32a) on both the surfaces, a negative electrode foil exposed portion (32b), and insulating layers (31). The negative electrode foil exposed portion (32b) where the copper foil (45) is exposed is formed in an end portion on one side in a width direction of the copper foil (45). The insulating layers (31) are disposed on the negative electrode mixture layers (32a) and on the negative electrode foil exposed portion (32b). The insulating layer (31) includes a window portion (31a) at a position corresponding to a boundary part between the negative electrode mixture layer (32a) and the negative electrode foil exposed portion (32b). An end portion of the negative electrode mixture layer (32a) is visually recognizable from the window portion (31a).

9 Claims, 14 Drawing Sheets

(56) References Cited

FOREIGN PATENT DOCUMENTS

| JP | 2016-110707 A | 6/2016 |
| KR | 10-2016-0091732 A | 8/2016 |
| WO | WO-2006/093049 A1 | 9/2006 |
| WO | WO-2017/130821 A1 | 8/2017 |

OTHER PUBLICATIONS

International Search Report with English translation and Written Opinion issued in corresponding application No. PCT/JP2018/010512 dated May 15, 2018.
Extended European Search Report dated Apr. 7, 2021, in European Application No. 18848685.6.
Office Action dated Mar. 26, 2021, in Korean Application No. 10-2019-7038379.

* cited by examiner

SECONDARY BATTERY

TECHNICAL FIELD

The present invention relates to a secondary battery used for, for example, in-vehicle use.

BACKGROUND ART

A secondary battery used for, for example, in-vehicle use includes a lithium ion secondary battery produced by interposing a film-shaped separator between a positive electrode and a negative electrode and laminating and winding them. The positive electrode and the negative electrode are manufactured by applying mixture layers on both surfaces of metal foils and performing drying and pressing. The separator is a porous film and manufactured by extending a sheet-shaped resin. The positive electrode and the negative electrode have roles of charge and discharge, and the separator has a role of electrically insulating the positive electrode from the negative electrode.

As described above, since the separator is the porous film made of resin, when an internal short-circuit derived from a foreign matter and nailing from outside occurs to generate heat, the separator melts, and a spread of a region where the internal short-circuit occurs further generates heat, possibly leading to an event, such as a high temperature.

Therefore, there has been proposed formation of an insulating layer made of inorganic filler on a positive electrode or a negative electrode to avoid an increase in region where internal short-circuit occurs even when the separator thus melts and disappears (Patent Literature 1). The insulating layer is made of inorganic filler and therefore does not melt through heat generation. Even when the heat generation melts the separator, the insulating layer can avoid the increase in region where the internal short-circuit occurs in the positive and negative electrodes.

Additionally, as a method for forming an insulating layer, there has been disclosed a rational manufacturing method that simultaneously coats to form two layers of mixture layers and the insulating layers on a current collector and simultaneously removes volatile components contained therein (Patent Literature 2).

CITATION LIST

Patent Literature

Patent Literature 1: WO2006/093049
Patent Literature 2: JP 2006-48942 A

SUMMARY OF INVENTION

Technical Problem

The insulating layer formed on the electrode is white; therefore, a formation position of the mixture layer cannot be confirmed in the electrode where the insulating layer is formed. This makes it difficult to perform winding while adjusting the positions of the mixture layers in the positive electrode and the negative electrode and causes a problem that the positive electrode and the negative electrode are laminated with the positions of the mixture layers in the positive electrode and the negative electrode displaced. Additionally, with the disclosed method that simultaneously coats the two layers, the mixture layer and the insulating layer, the mixture layer is covered with the insulating layer; therefore, a width and a position of the mixture layer as a lower layer cannot be inspected, and this causes a problem that the production cannot be established.

The present invention has been made in consideration of the above-described points and an object of which is to provide a secondary battery that allows grasping a position of a mixture layer on an electrode and facilitates adjustment of positions of a positive electrode and a negative electrode.

Solution to Problem

A secondary battery of the present invention to solve the problem includes an electrode that includes a strip-shaped metal foil having both surfaces, mixture layers on both the surfaces, a metal foil exposed portion, and insulating layers. The metal foil exposed portion where the metal foil is exposed is formed in an end portion on one side in a width direction of the metal foil. The insulating layers are disposed on the mixture layers and on the metal foil exposed portion. The insulating layer includes a window portion at a position corresponding to a boundary part between the mixture layer and the metal foil exposed portion. An end portion of the mixture layer is visually recognizable from the window portion.

Advantageous Effects of Invention

With the present invention, even when the insulating layer is formed on the mixture layer, a formation position of the mixture layer can be confirmed. Accordingly, positions of the positive electrode and the negative electrode can be accurately adjusted during winding. Further, a rational manufacturing method is established to ensure coating two layers, the mixture layer and the insulating layer, on a current collector, and dry the two layers simultaneously.

Additional features related to the present invention become apparent from descriptions of the specification and the attached drawings. Objects, configurations, and effects other than the above-described ones become apparent from the following explanation of embodiments.

DESCRIPTION OF EMBODIMENTS

Figure 1:
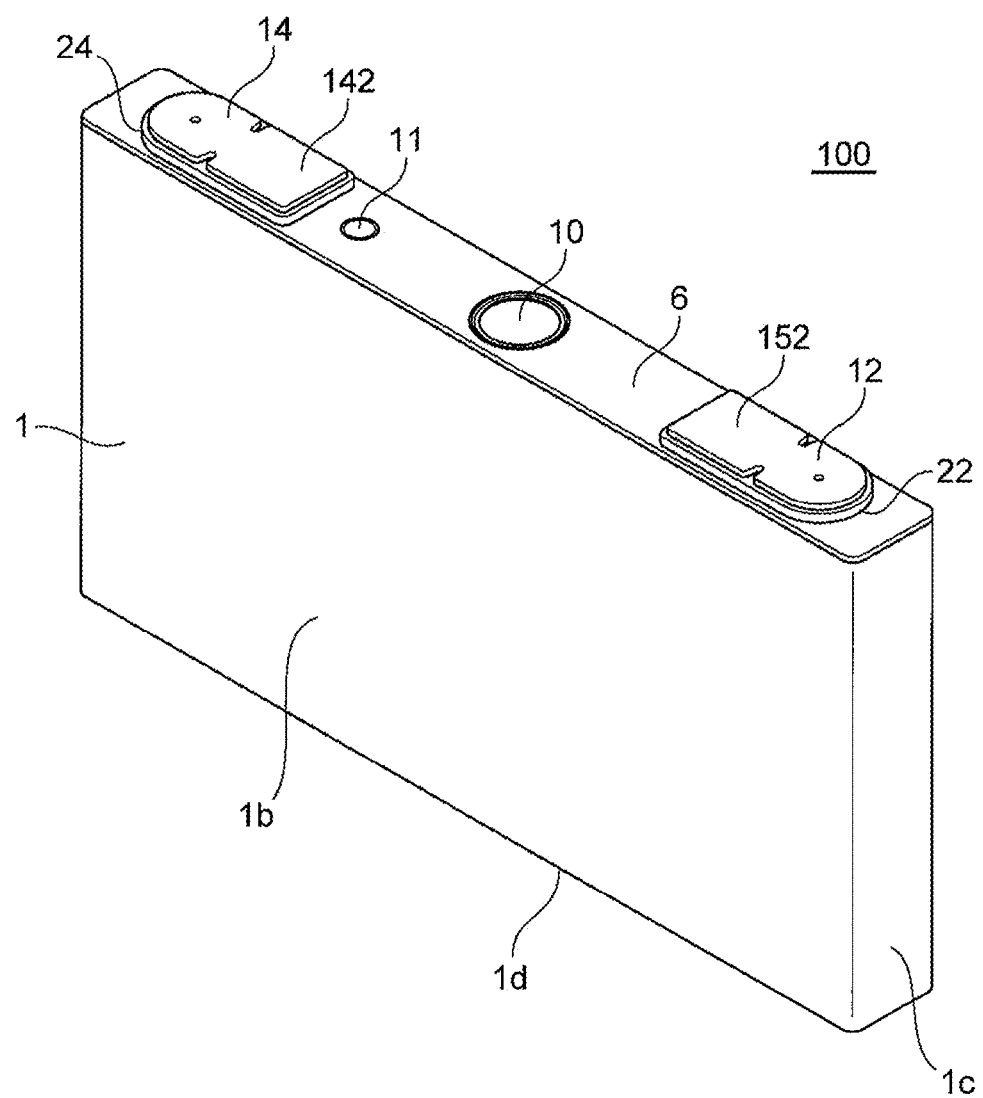
FIG. 1 is an external perspective view of a square secondary battery.

Embodiments of the present invention will be described below by referring to the drawings.

Figure 2:
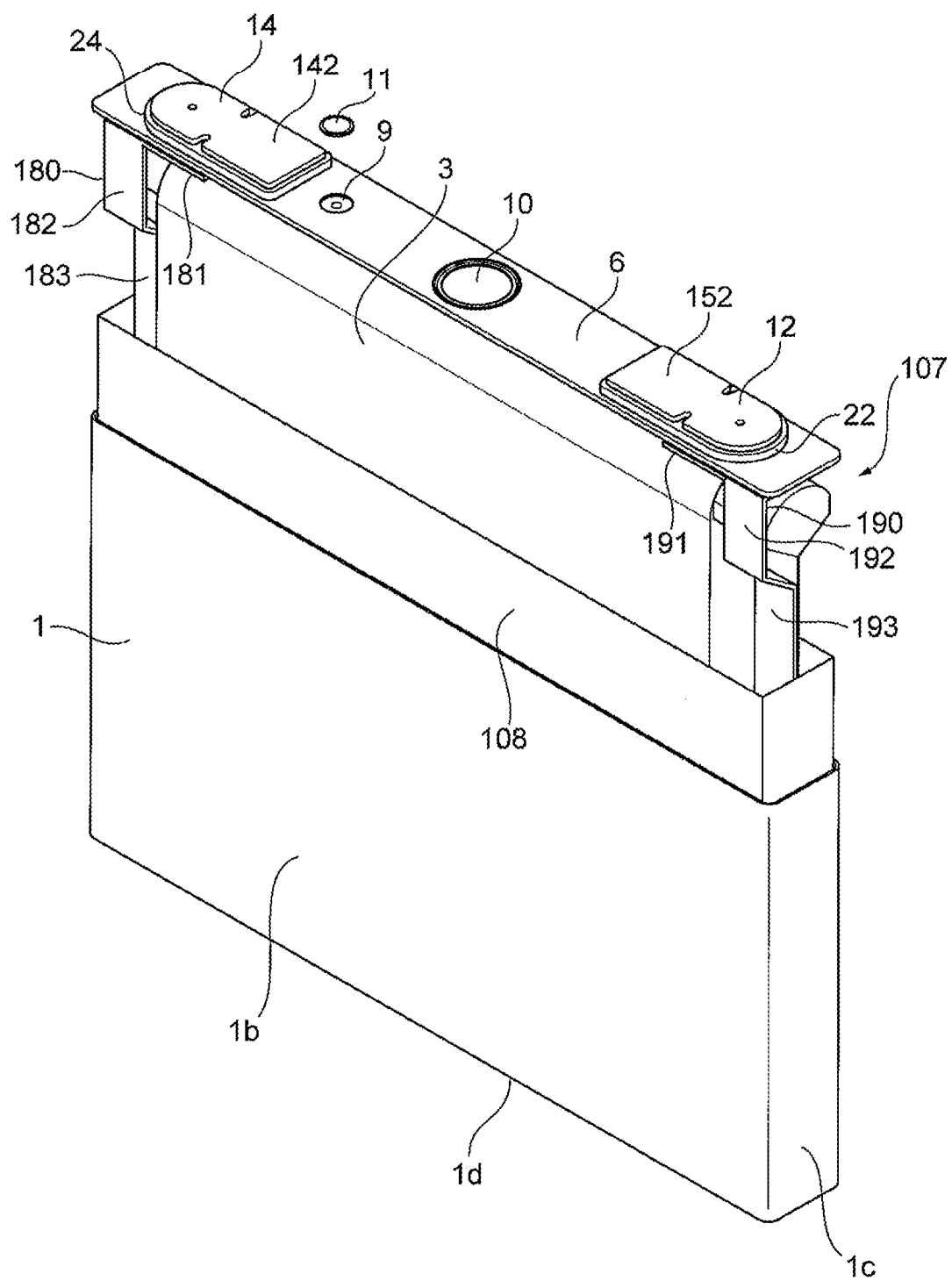
FIG. 2 is an exploded perspective view of the square secondary battery.

FIG. 1 is an external perspective view of a square secondary battery 100, and FIG. 2 is an exploded perspective view illustrating a configuration of the square secondary battery 100.

As illustrated in FIG. 1, the square secondary battery 100 includes a battery container formed of a battery can 1 and a battery lid 6. The battery can 1 and the battery lid 6 are made of a material, such as aluminum or an aluminum alloy. Deep drawing is performed on the battery can 1 to form the battery can 1 into a flat rectangular box shape with an open one end. The battery can 1 includes a bottom surface 1d having a rectangular flat plate shape, a pair of wide-width side surfaces 1b disposed on a pair of respective long side portions of the bottom surface 1d, and a pair of narrow-width side surfaces 1c disposed on a pair of respective short side portions of the bottom surface 1d.

The battery lid 6 has a rectangular flat plate shape and is laser-welded so as to cover the opening in the battery can 1. That is, the battery lid 6 seals the opening of the battery can 1. In the battery lid 6, a positive electrode external terminal 14 and a negative electrode external terminal 12 electrically coupled to a positive electrode 34 and a negative electrode 32 (see FIG. 3) in a wound group 3 are disposed. Note that a positive electrode side external insulator 24 and a negative electrode side external insulator 22 to avoid short circuit are disposed between the positive electrode external terminal 14 and the battery lid 6 and between the negative electrode external terminal 12 and the battery lid 6, respectively.

A flat plate-shaped busbar welding portion 142 and a flat plate-shaped busbar welding portion 152 are disposed on the positive electrode external terminal 14 and the negative electrode external terminal 12, respectively. When a battery pack is manufactured, bringing busbars into abutment with the busbar welding portions 142 and 152 and performing welding couples between the busbar and the positive electrode external terminal 14 and between the busbar and the negative electrode external terminal 12.

The battery lid 6 includes a gas discharge valve 10. The gas discharge valve 10 is formed by partially thinning the battery lid 6 through presswork. Note that a thin film member may be attached to the opening in the battery lid 6 by laser welding or the like to configure the thin wall part as a gas discharge valve. When the square secondary battery 100 generates heat due to abnormality, such as overcharge, to generate a gas and a pressure inside the battery container increases to reach a predetermined pressure, the gas discharge valve 10 ruptures and discharges the gas from the inside to reduce the pressure inside the battery container.

As illustrated in FIG. 2, the battery can 1 houses the wound group 3 (see FIG. 3) held to a lid assembly 107. The battery can 1 houses a positive electrode current collector 180 joined to the positive electrode 34 (see FIG. 3) in the wound group 3, a negative electrode current collector 190 joined to the negative electrode 32 (see FIG. 3) in the wound group 3, and the wound group 3 in a state covered with an insulating case 108. The insulating case 108 is made of a resin material having an insulating property, such as polypropylene, to electrically insulate between the battery can 1 and the wound group 3. The lid assembly 107 here means an integral assembly of the wound group 3, the positive electrode current collector 180, the positive electrode external terminal 14, the negative electrode current collector 190, the negative electrode external terminal 12, and the battery lid 6.

The positive electrode external terminal 14 is electrically coupled to the positive electrode 34 (see FIG. 3) in the wound group 3 via the positive electrode current collector 180, and the negative electrode external terminal 12 is electrically coupled to the negative electrode 32 (see FIG. 3) in the wound group 3 via the negative electrode current collector 190. In view of this, an electric power is supplied to an external device via the positive electrode external terminal 14 and the negative electrode external terminal 12, or an electric power generated outside is supplied to and charged to the wound group 3 via the positive electrode external terminal 14 and the negative electrode external terminal 12.

The positive electrode current collector 180 includes a seated portion 181 coupled to the positive electrode external terminal 14, a joining planar portion 183 coupled to the positive electrode 34, and a planar portion 182 disposed between the seated portion 181 and the joining planar portion 183.

Similarly to the positive electrode current collector 180, the negative electrode current collector 190 has a structure including a seated portion 191 coupled to the negative electrode external terminal 12, a joining planar portion 193 coupled to the negative electrode 32, and a planar portion 192 disposed between the seated portion 191 and the joining planar portion 193.

As illustrated in FIG. 2, a liquid injection hole 9 to inject an electrolyte into the battery container is drilled in the battery lid 6. The liquid injection hole 9 is sealed with a liquid injection plug 11 after injecting the electrolyte. As the electrolyte, for example, a nonaqueous electrolyte produced by dissolving a lithium salt, such as lithium hexafluorophosphate ($LiPF_6$), in a carbonate ester-based organic solvent, such as ethylene carbonate, can be used.

Figure 3:
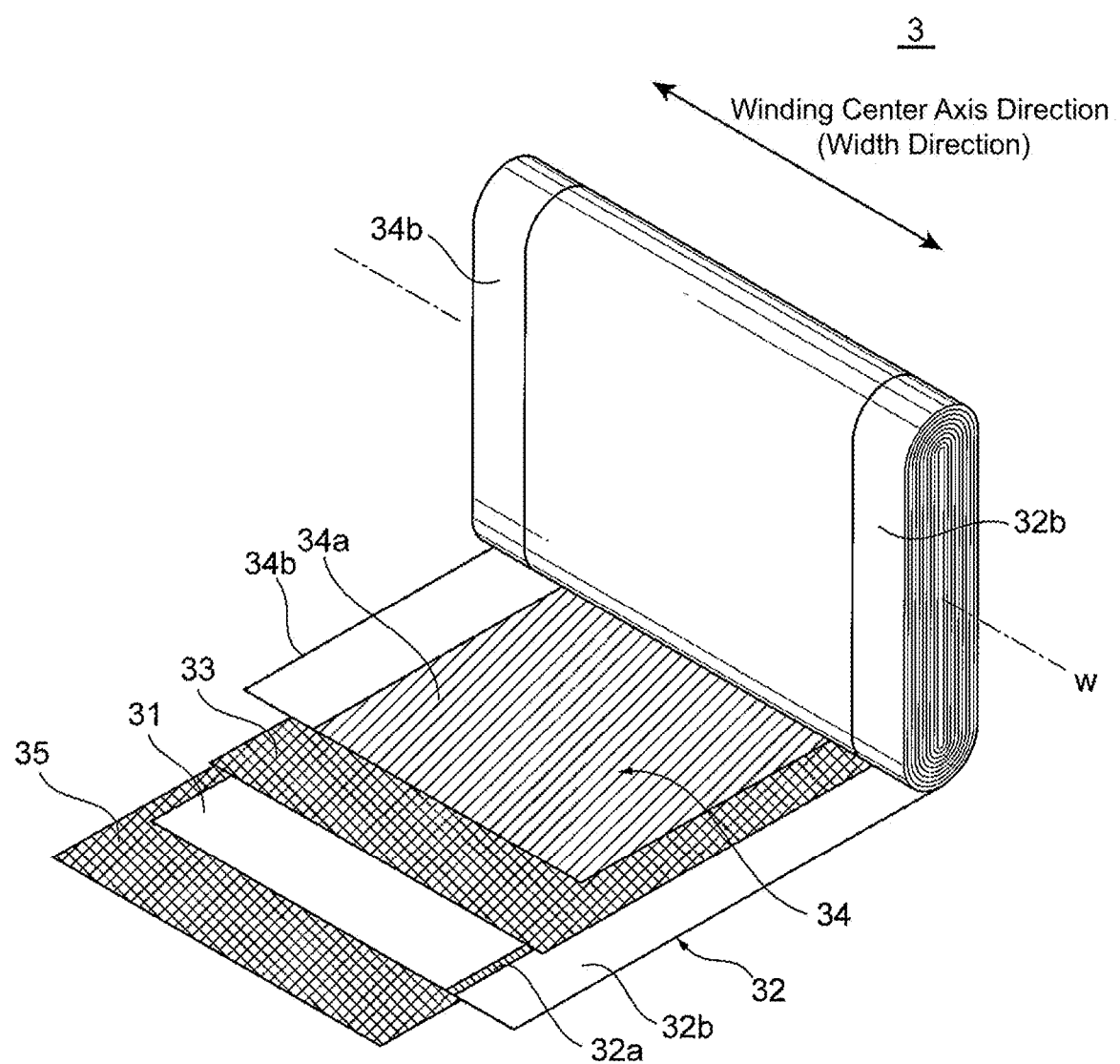
FIG. 3 is a developed perspective view of an electrode group.

The following describes the wound group 3 with reference to FIG. 3. FIG. 3 is a perspective view illustrating the wound group 3 and illustrating a state of deploying a winding end side of the wound group 3. The wound group 3 as a power generating element has a laminated structure formed by interposing separators 33 and 35 between the elongated positive electrode 34 and negative electrode 32 and winding it around a winding center axis W into a flat shape.

The positive electrode 34 includes positive electrode mixture layers 34a produced by applying positive electrode active material mixtures over both surfaces of a positive electrode foil as a positive electrode current collector and a positive electrode foil exposed portion 34b in an end portion on one side in the width direction of the positive electrode foil over which the positive electrode active material mixture is not applied.

The negative electrode 32 includes negative electrode mixture layers 32a produced by applying negative electrode active material mixtures over both surfaces of a negative electrode foil as a negative electrode current collector and a negative electrode foil exposed portion 32b in an end portion on one side in the width direction of the negative electrode foil over which the negative electrode active material mixture is not applied. An insulating layer 31 made of an inorganic filler is disposed on the negative electrode mixture layer 32a and on a part of the negative electrode foil exposed portion 32b. The insulating layer 31 is applied widely over the negative electrode mixture layer 32a up to the negative electrode foil exposed portion 32b side. The insulating layer 31 is coated on the negative electrode mixture layer 32a so as to have a predetermined standard thickness t1 (see FIG. 11A). When the insulating layer 31 is coated with the standard thickness t1, a white-based material having a transparency to an extent that the negative electrode mixture layer 32a, which is positioned below the insulating layer 31, cannot be visually recognized is used.

The positive electrode foil exposed portion 34b and the negative electrode foil exposed portion 32b are regions where metal surfaces of the electrode foils are exposed and disposed separated at positions on one side and the other side in the winding center axis W direction (width direction in FIG. 3). The positive electrode foil exposed portion 34b and the negative electrode foil exposed portion 32b are wound in a state of being piled up one another via the separators 33 and 35 between them, thus forming the wound group 3.

Figure 4:
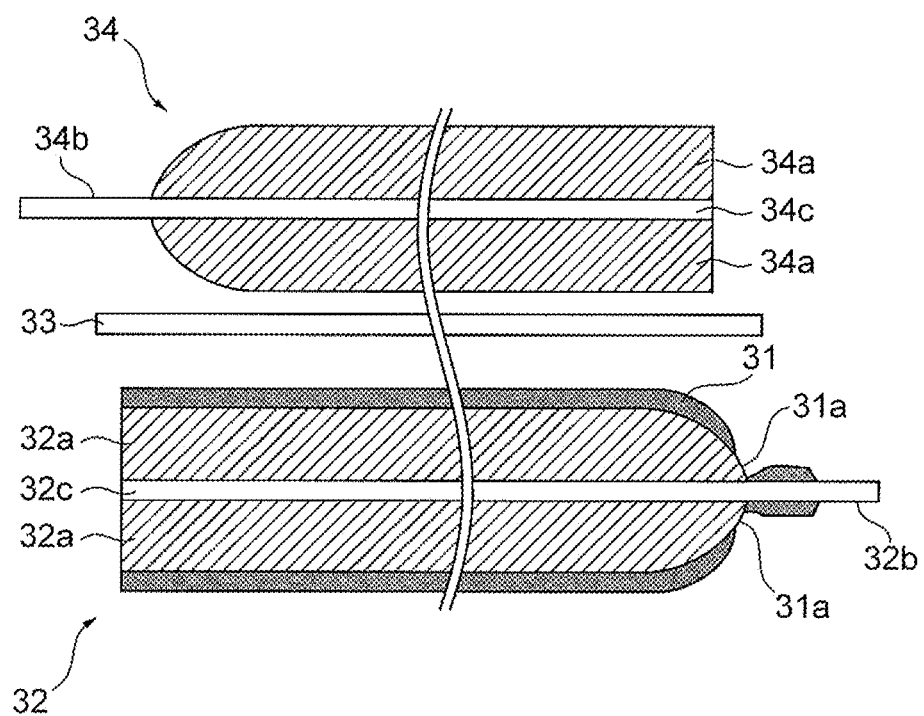
FIG. 4 is a cross-sectional view of laminated positive electrode, separator, and negative electrode in a short width direction.

FIG. 4 is a cross-sectional view of the laminated positive electrode 34, separator 33, and negative electrode 32 in the short width direction. In the positive electrode 34, the positive electrode mixture layers 34a are formed on both surfaces of a strip-shaped positive electrode foil 34c and the positive electrode foil exposed portion 34b is disposed on one end portion in the width direction. In the negative electrode 32, the negative electrode mixture layers 32a are formed on both surfaces of a strip-shaped negative electrode foil 32c and the negative electrode foil exposed portion 32b is disposed in one end portion. The negative electrode 32 includes the insulating layers 31. The insulating layers 31 are formed on the negative electrode mixture layers 32a and on a part of the negative electrode foil exposed portion 32b. The separator 33 is interposed between the positive electrode 34 and the negative electrode 32.

The insulating layer 31 includes a window portion 31a to visually recognize an end portion of the negative electrode mixture layer 32a at a position corresponding to a boundary part between the negative electrode mixture layer 32a and the negative electrode foil exposed portion 32b. The window portion 31a has an opening from which the end portion of the negative electrode mixture layer 32a is exposed or a transparent thin film portion having a thickness thinner than a part laminated on the negative electrode mixture layer 32a through which the end portion of the negative electrode mixture layer 32a can be visually recognized.

Figure 5:
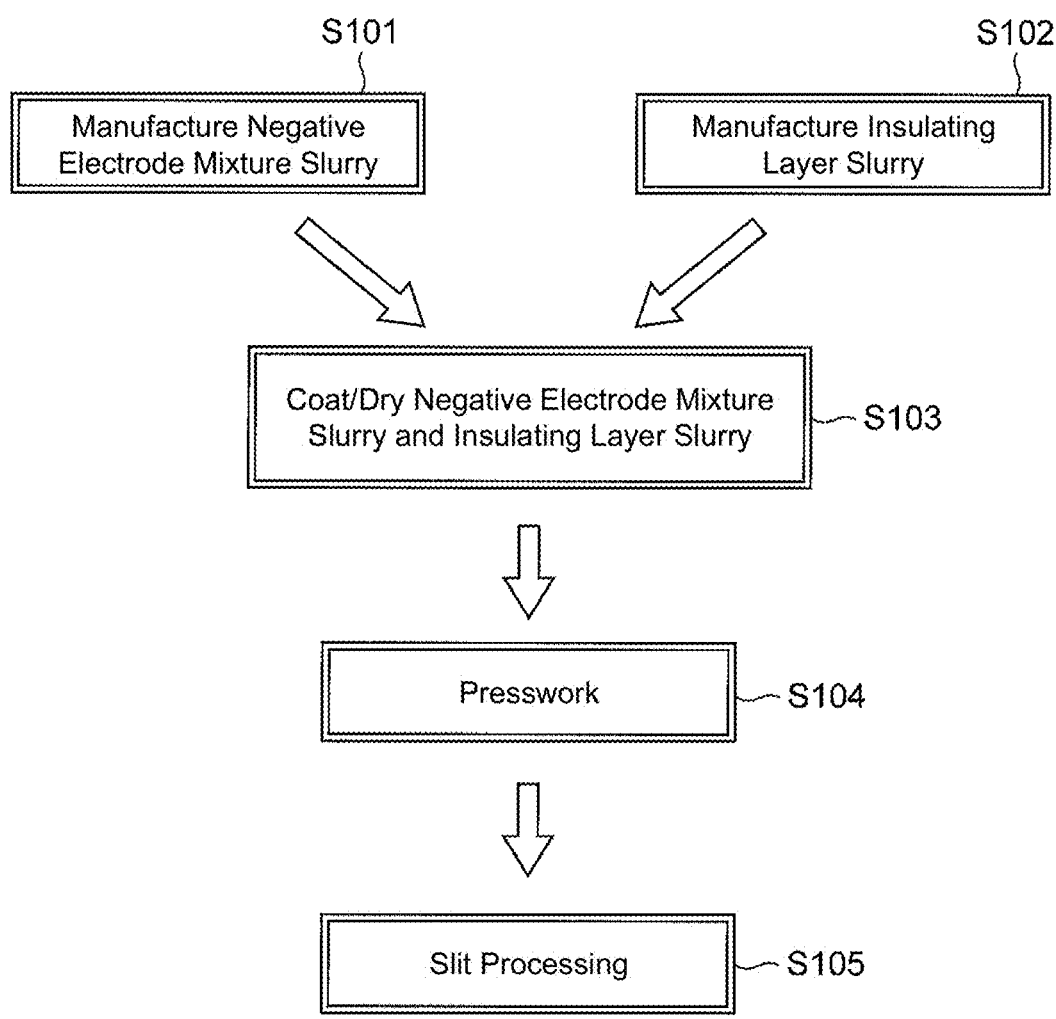
FIG. 5 is a manufacturing flow of the negative electrode.

Next, a specific manufacturing method will be described. FIG. 5 illustrates a manufacturing flow of the negative electrode 32. At Step S101, 10 pts. wt. of polyvinylidene fluoride (hereinafter referred to as PVDF) as a binder is added to 100 pts. wt. of an amorphous carbon powder as a negative electrode active material, and N-methyl pyrrolidone (hereinafter referred to as NMP) as a dispersing solvent is added to this, thus manufacturing mixed negative electrode mixture slurry. While the case of using the amorphous carbon as the negative electrode active material has been described, the material is not limited to this. Natural graphite and various kinds of artificial graphite materials into which lithium ions can be inserted or from which lithium ions can be desorbed, a carbonaceous material, such as coke, a compound, such as Si and Sn (for example, SiO and $TiSi_2$), or a composite material of these substances may be used. Examples of their particle shapes include a scaly shape, a spherical shape, a fiber shape, and a lump shape, and the shapes are not especially limited. To use various kinds of graphite as the negative electrode active material, water is selectable as the dispersing solvent, thus ensuring reduction in environmental load. An example of water-based negative electrode slurry includes negative electrode mixture slurry produced by adding 1 pts. wt. of styrene butadiene rubber (hereinafter referred to as SBR) as a binder and 1 pts. wt. of carboxymethylcellulose sodium (hereinafter referred to as CMC) as a viscosity increaser to 100 pts. wt. of natural graphite powder.

At Step S102, 3 pts. wt. of SBR as a binder is added to 100 pts. wt. of alumina as inorganic filler, and, using ion exchanged water as dispersing solvent, the product is mixed to manufacture an insulating layer slurry. While the case of using alumina as the insulating inorganic particles has been described, the insulating inorganic particles are not limited to this. The inorganic particles may be oxide fine particles, such as silica, zirconia, lithium carbonate, and boehmite. Examples of their particle shapes include a scaly shape, a spherical shape, a fiber shape, and a lump shape, and the shapes are not especially limited. While the SBR as the binder has been described as 3 pts. wt., since the binder interferes with movement of ions occurred during reaction between the positive electrode and the negative electrode, an additive amount of the SBR is preferably further small, but the amount is not especially limited to this.

These negative electrode mixture slurry and insulating layer slurry are formed on a copper foil as the negative electrode foil in accordance with the manufacturing flow illustrated in FIG. 5 to manufacture the negative electrode. At Step S103, coating/drying of the negative electrode mixture slurry and the insulating layer slurry are performed. At Step S104, a presswork to perform roll press on the negative electrode is performed, and at Step S105, slit processing that performs cutting to a predetermined width is performed.

Figure 6:
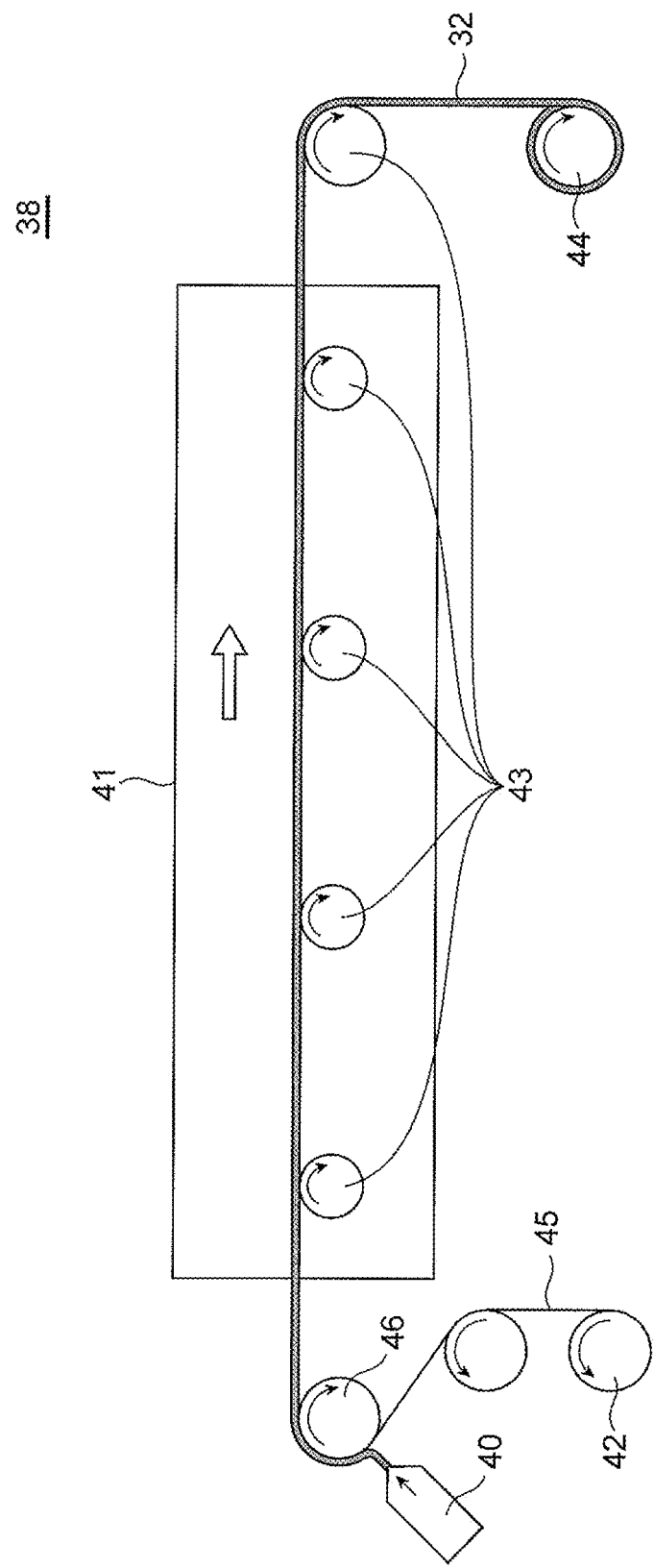
FIG. 6 is a drawing describing a coating/drying step of the negative electrode.

FIG. 6 is a drawing illustrating the coating/drying step of the negative electrode mixture slurry and the insulating layer slurry. A coating dryer 38 illustrated in FIG. 6 includes a die head 40 having a role of coating and a drying furnace 41 having a role of volatilizing and drying coated solvent. Additionally, conveyance rollers 43 are disposed to sequentially convey a copper foil 45 as a substrate to the application part and the drying part. A unwind roller 42 and a roll-up roller 44 are respectively disposed to unwind and roll up the copper foil 45. The copper foil 45 constituting the negative electrode foil 32c is conveyed along the conveyance rollers 43 by the unwind roller 42.

The die head 40 discharges the negative electrode mixture slurry and the insulating layer slurry in a state of being laminated to one another toward a back roll 46 and coats the slurries over a surface of the copper foil 45 wound around the back roll 46.

With the die head 40, the negative electrode mixture slurry with a thickness of 50 µm to 200 µm is coated over the copper foil 45 and the insulating layer slurry with a thickness of 5 µm to 20 µm is coated over the negative electrode mixture slurry. The copper foil 45 is conveyed to the drying furnace 41 and the solvent components in the negative electrode mixture slurry and in the insulating layer slurry are volatilized and dried by circulating hot wind at 60 to 100° C., thus forming the negative electrode mixture layers 32a and the insulating layers 31. The respective film thicknesses after the drying are reduced to about the halves. After the drying, the negative electrode mixture layers 32a and the insulating layers 31 are rolled up together with the copper foil 45 by the roll-up roller 44 into a roll shape. The rolled-up roll is again conveyed from the unwind roller 42, and the back surface is similarly formed to manufacture the negative electrode 32.

Figure 7:
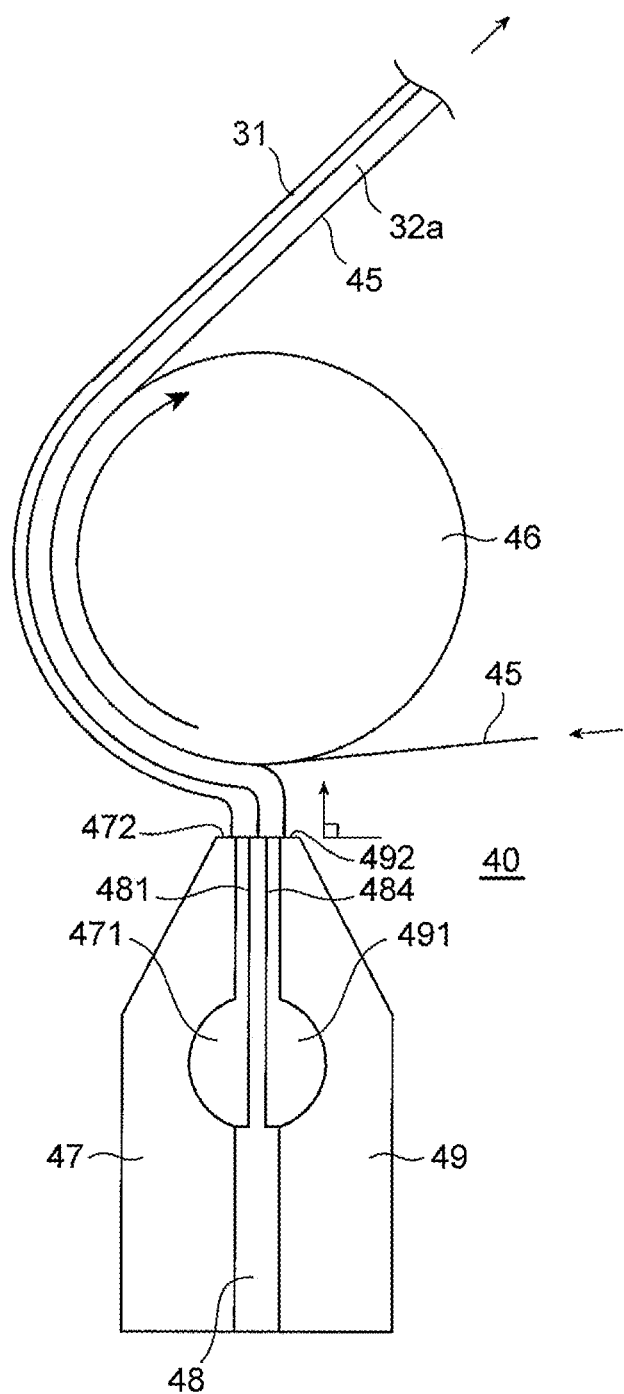
FIG. 7 is a cross-sectional view schematically illustrating a configuration of a coated portion.

FIG. 7 is a drawing schematically illustrating a configuration of the coated portion and a drawing illustrating details of the extracted die head 40 and back roll 46 parts illustrated in FIG. 6.

The die head 40 includes an outlet-side block 47, a shim 48, and an inlet-side block 49. Inside of the die head 40, an insulating layer slurry manifold 471 and a negative electrode mixture slurry manifold 491 are disposed. The two kinds of slurries are discharged from the respective manifolds perpendicularly to the copper foil 45 simultaneously, thus simultaneously applying the two layers.

Figure 8:
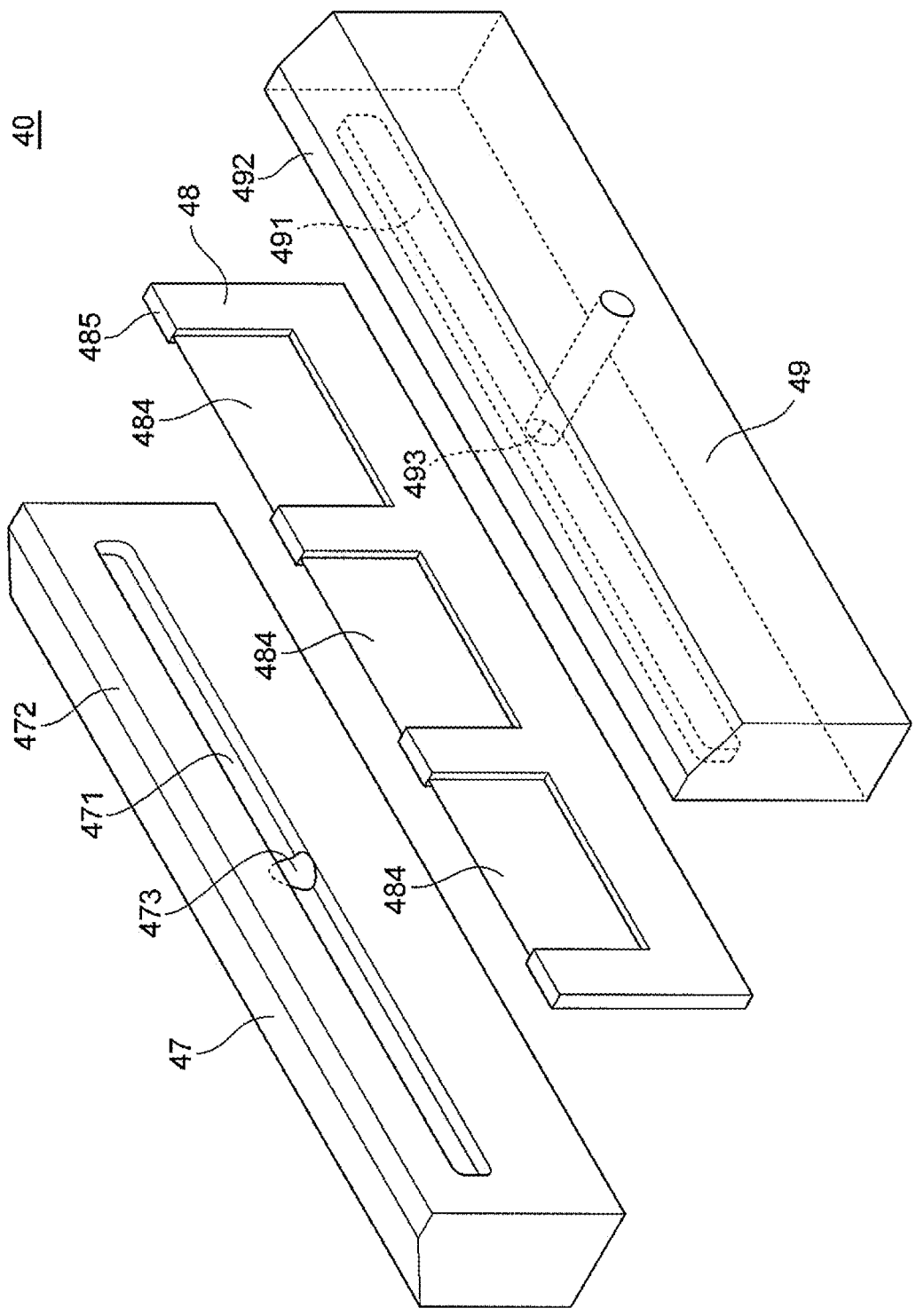
FIG. 8 is an exploded perspective view of a die head.

FIG. 8 is an exploded perspective view of the die head 40. The one shim 48 is sandwiched between the outlet-side block 47 and the inlet-side block 49. The shim 48 has a three-dimensional shape where depressed grooves 481 and 484 serving as flow passages for slurries are formed in both surfaces of the shim 48.

The die head 40 has a flat distal end surface and respective discharge ports for the two types of slurries are open in the flat distal end surface. The negative electrode mixture slurry and the insulating layer slurry are discharged from the two discharge ports and piled up to be parallel to one another. The die head 40 has a configuration in which the one shim 48 is sandwiched and the negative electrode mixture slurry and the insulating layer slurry are respectively discharged from one surface side and the other surface side of the shim 48. This avoids a relative positional displacement between the negative electrode mixture slurry and the insulating layer slurry in the width direction, and this eliminates the need for an alignment adjustment work that adjusts the relative position in the die head 40.

When the shim 48 is sandwiched between the inlet-side block 49 and the outlet-side block 47 to be assembled, a distal end surface of the die head 40 is formed such that a distal end surface 492 of the inlet-side block 49, a distal end surface 472 of the outlet-side block 47, and a distal end surface 485 of the shim 48 are flush with one another.

The die head 40 is disposed such that the flat distal end surface is opposed to the back roll 46 with a predetermined clearance and has a posture in a state of perpendicular to a radial direction of the back roll 46. That is, the die head 40 is disposed such that the flat distal end surface becomes parallel to a tangent line of the back roll 46.

The negative electrode mixture slurry and the insulating layer slurry pass through the depressed grooves 484 and 481 from the negative electrode mixture slurry manifold 491 and the insulating layer slurry manifold 471 and, as illustrated in FIG. 7, discharged from the discharge ports of the die head 40 toward the direction perpendicular to the flat distal end surface. The negative electrode mixture slurry and the insulating layer slurry are discharged from the discharge ports of the die head 40 to the back roll 46 in the state of being piled up to be parallel to one another, bent at approximately right angle at the back roll 46, and coated over the surface of the copper foil 45.

As described above, the die head 40 is disposed such that the flat distal end surface becomes parallel to the tangent line of the back roll 46, and the negative electrode mixture slurry and the insulating layer slurry are discharged from the discharge ports of the die head 40 toward the direction perpendicular to the flat distal end surface. This ensures avoiding a contact of the distal end of the outlet-side block 47 with the two-layer slurry films and formation of a stripe-shaped scar.

Figure 9:
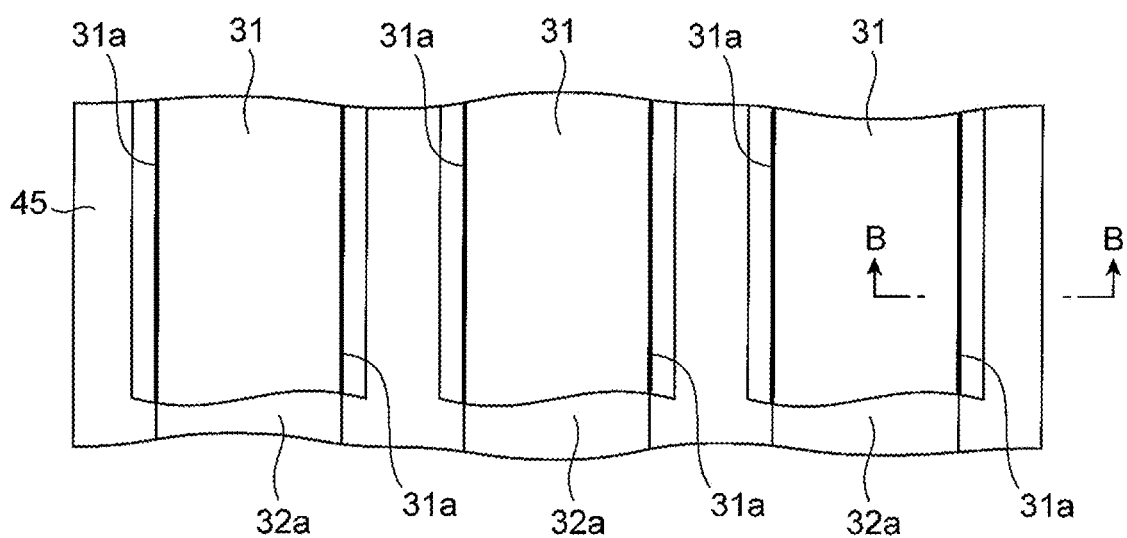
FIG. 9 is a plan view of an electrode coated with the die head.

FIG. 9 is a plan view of an electrode coated with the above-described die head 40. In this embodiment, multiple forming can be performed to form three sheets of the negative electrode mixture layers 32a and the insulating layers 31 in a stripe pattern on the copper foil 45 and obtain three negative electrodes by cutting performed later. In the negative electrode 32, the insulating layers 31 are formed on the negative electrode mixture layers 32a. The window portion 31a is disposed on the end portion of the negative electrode mixture layer 32a in the insulating layer 31. That is, the insulating layer 31 includes the window portion 31a to visually recognize the end portion of the negative electrode mixture layer 32a at the position corresponding to the boundary part between the negative electrode mixture layer 32a and the metal foil exposed portion. The window portion 31a has the opening from which the end portion of the negative electrode mixture layer 32a is exposed or the thin film portion through which the end portion of the negative electrode mixture layer 32a can be visually recognized. Accordingly, the position of the end portion of the negative electrode mixture layer 32a can be confirmed through the window portion 31a.

While in this embodiment, the window portions 31a are continuously disposed along the boundary parts between the negative electrode mixture layers 32a and the metal foil exposed portion, the configuration is not limited to this, and it is only necessary that the window portion 31a allows visually recognizing the position of the end portion of the negative electrode mixture layer 32a. For example, the window portions 31a may be disposed at predetermined intervals along the boundary parts between the negative electrode mixture layers 32a and the metal foil exposed portion and, for example, may be discontinuously disposed into a perforation pattern.

The following describes one example of a method for manufacturing the negative electrode 32 including the window portions 31a.

Figure 10A:
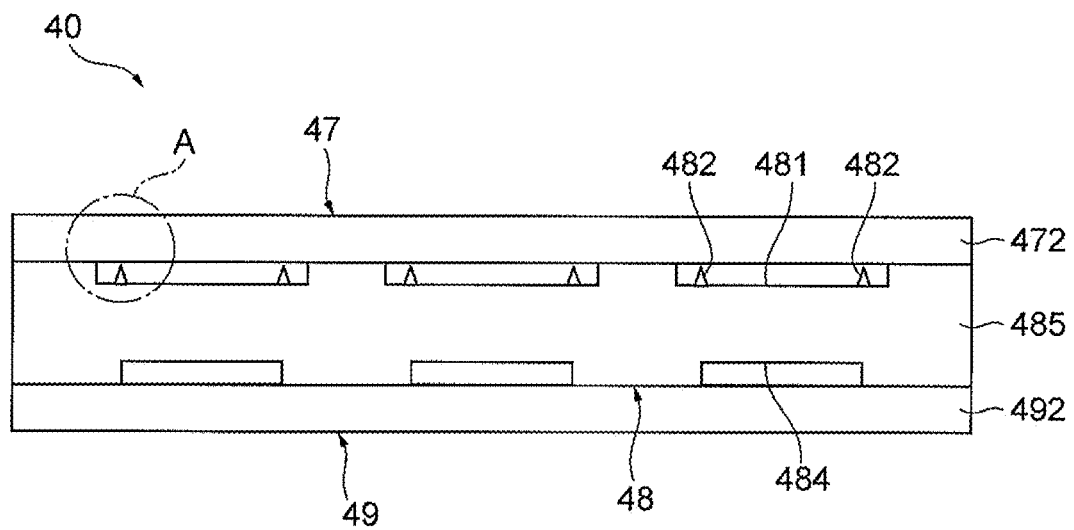
FIG. 10A is a drawing illustrating a discharge port of the die head.
Figure 10B:
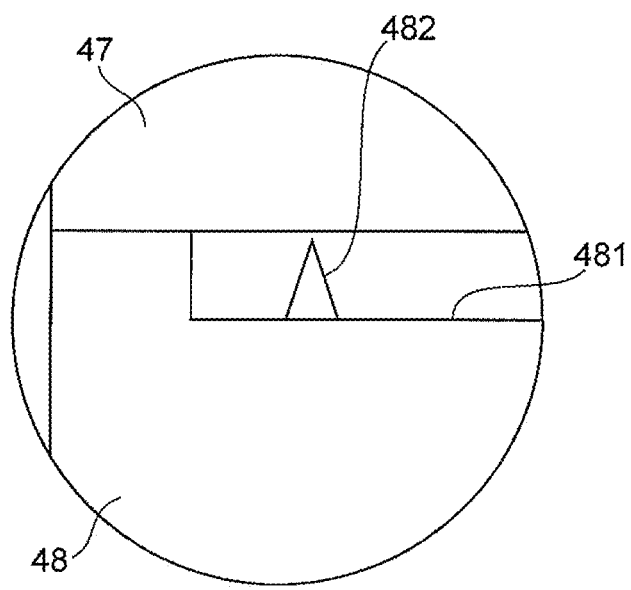
FIG. 10B is a drawing illustrating an enlarged part A of FIG. 10A.
Figure 10C:
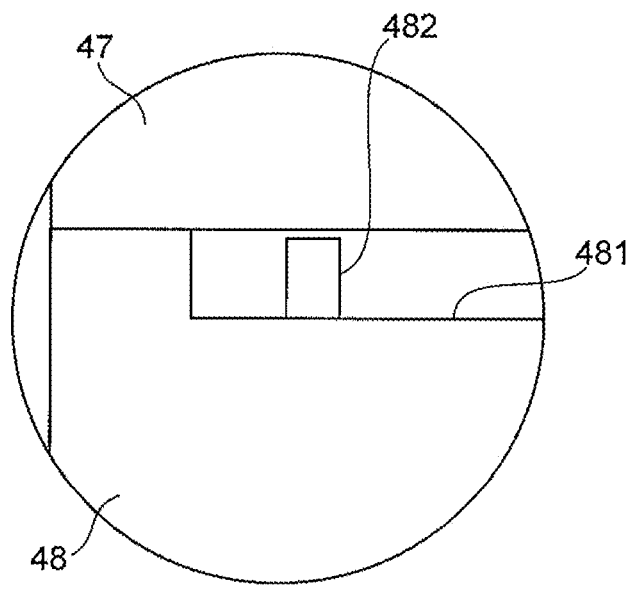
FIG. 10C is a drawing corresponding to FIG. 10B illustrating a modification.

FIG. 10A is a drawing illustrating the discharge port of the die head, FIG. 10B is a drawing illustrating an enlarged part A of FIG. 10A, and FIG. 10C is a drawing corresponding to FIG. 10B illustrating a modification. FIG. 10A illustrates a state where the shim 48 is sandwiched between the outlet-side block 47 and the inlet-side block 49 to be assembled. FIG. 10A illustrates a drawing of viewing the die head 40 from the discharge port side discharging the slurry.

The depressed groove 481 from which the insulating layer slurry is discharged and the depressed groove 484 from which the negative electrode mixture slurry is discharged are separately disposed at positions corresponding to respective one surface and the other surface of the shim 48. The depressed groove 481 has a width wider than that of the depressed groove 484, and the depressed groove 481 has both end portions disposed at positions laterally projecting with respect to both end portions of the depressed groove 484.

The depressed groove 481 includes projecting portions 482 to form the window portions 31a in the insulating layer 31. The projecting portions 482 are disposed at positions corresponding to end portions on both sides in the width direction of the depressed groove 484. The flow of the slurry of the insulating layer slurry flowing through the depressed groove 481 is cut off by the projecting portions 482 to restrict amounts of the slurry discharged from parts at the positions where the projecting portions 482 are formed. As a result, the window portions 31a are formed at the parts corresponding to the positions.

For example, as illustrated in FIG. 10B and FIG. 10C, the projecting portions 482 having a triangular shape and a rectangular shape as a cross-sectional shape can be employed. The shape and a size of the window portion 31a are determined according to the size and the cross-sectional shape of the projecting portion 482. For example, by increasing the size of the projecting portion 482 to increase the restricted amount of slurry, an opening from which the end portion of the negative electrode mixture layer 32a is exposed can be formed in the insulating layer 31. Alternatively, by decreasing the size of the projecting portion 482 to reduce the restricted amount of slurry, the film thickness of such a part of the insulating layer 31 is finished thinly. Accordingly, the transparent thin film portion having the thickness thinner than the part laminated on the negative electrode mixture layer 32a through which the end portion of the negative electrode mixture layer 32a can be visually recognized can be formed.

Figure 11A:
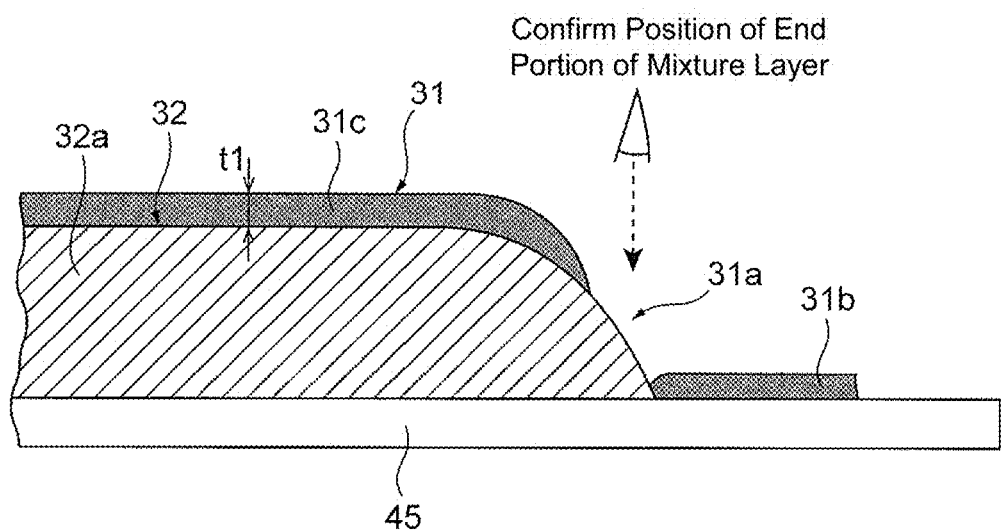
FIG. 11A is a cross-sectional view taken along the line B-B of FIG. 9.
Figure 11B:
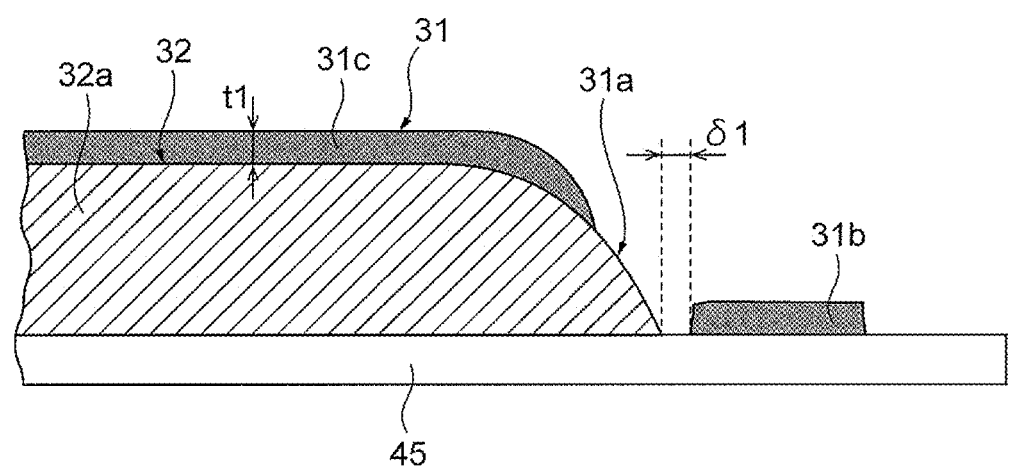
FIG. 11B is a cross-sectional view taken along the line B-B of FIG. 9.
Figure 11C:
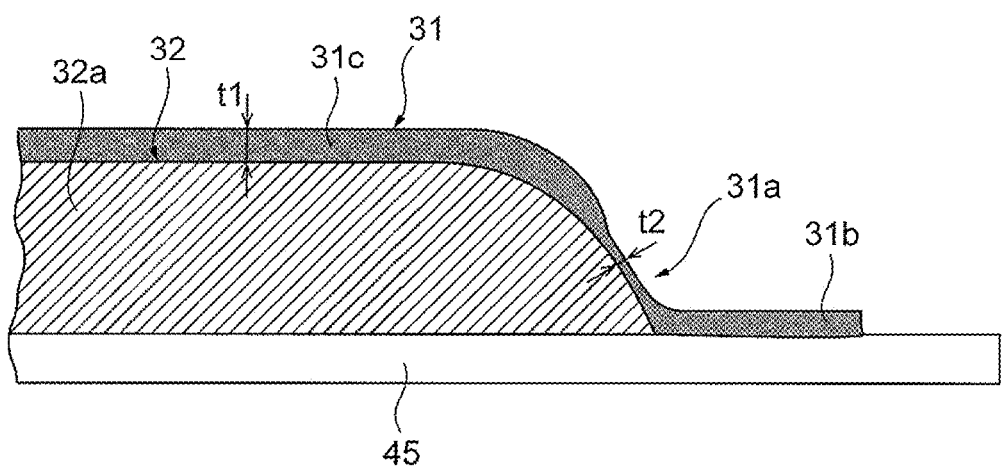
FIG. 11C is a cross-sectional view taken along the line B-B of FIG. 9.

FIG. 11A to FIG. 11C are cross-sectional views taken along the part B-B of FIG. 9. The negative electrode mixture layer 32a is formed on the copper foil 45, and the insulating layer 31 is formed on the negative electrode mixture layer 32a. The window portion 31a is present on the end portion of the negative electrode mixture layer 32a. A method for forming the window portion 31a can be achieved by employing the above-described shape of the slurry discharge port.

FIG. 11A and FIG. 11B illustrate a configuration in which the window portion 31a has an opening. The window portion 31a is disposed from the negative electrode mixture layer 32a through the negative electrode foil exposed portion. The end portion of the negative electrode mixture layer 32a is exposed from the opening of the window portion 31a. The insulating layer 31 includes a first coated portion 31c coated over the negative electrode mixture layer 32a and a second coated portion 31b coated over the copper foil 45. As illustrated in FIG. 11A, an end portion of the second coated portion 31b may overlap an end portion of the negative electrode mixture layer 32a, or as illustrated in FIG. 11B, the end portion of the second coated portion 31b may be away from the end portion of the negative electrode mixture layer 32a and have a clearance δ1.

With the configuration illustrated in FIG. 11A, in the second coated portion 31b, a thickness of a part overlapping the negative electrode mixture layer 32a is thinner than the standard thickness t1. Therefore, the boundary part between the negative electrode mixture layer 32a and the copper foil 45 is seen transparently. Accordingly, the position of the end portion of the negative electrode mixture layer 32a can be visually recognized. With the configuration illustrated in FIG. 11B, the end portion of the second coated portion 31b is away from the negative electrode mixture layer 32a by the clearance δ1, and the boundary part between the negative electrode mixture layer 32a and the copper foil 45 is exposed. Accordingly, the position of the end portion of the negative electrode mixture layer 32a can be directly visually recognized. With the configuration illustrated in FIG. 11C, a thickness t2 of the thin film portion of the window portion 31a is thinner than the standard thickness t1, and the boundary part between the negative electrode mixture layer 32a and the copper foil 45 is seen transparently. Accordingly, the position of the end portion of the negative electrode mixture layer 32a can be visually recognized through the transparent thin film portion.

Figure 12:
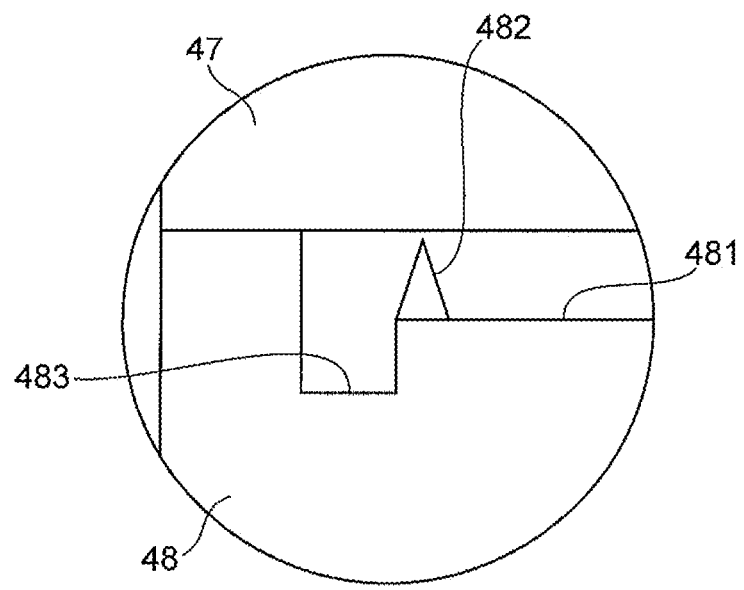
FIG. 12 is a drawing corresponding to FIG. 10B illustrating a modification.
Figure 13:
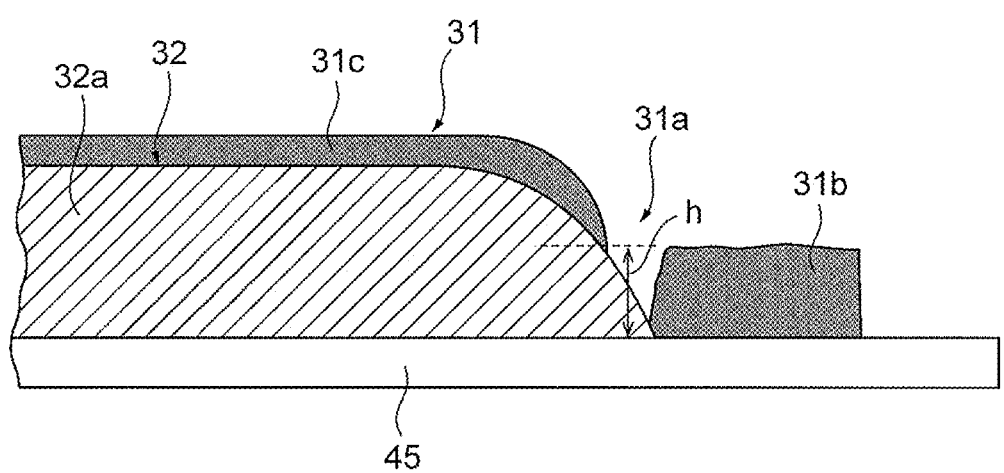
FIG. 13 is a drawing corresponding to FIG. 11A illustrating a modification.

FIG. 12 is a drawing corresponding to FIG. 10B illustrating a modification, and FIG. 13 is a drawing corresponding to FIG. 11A illustrating a modification.

As illustrated in FIG. 12, a configuration where a deep groove 483 having a groove depth larger than that of a depressed groove 481 may be disposed in an end portion of the depressed groove 481 of the shim 48. As illustrated in FIG. 13, this configuration allows thickening a thickness of the second coated portion 31b compared with the standard thickness t1 of the first coated portion 31c. By thickening the second coated portion 31b, an exposed area from the opening in the window portion 31a can be decreased. This allows avoiding the negative electrode mixture layer 32a in contact with a conductive foreign matter via the opening in the window portion 31a, thus avoiding short circuit. The thickness of the second coated portion 31b only needs to be thicker than the standard thickness t1 of the first coated portion 31c and is preferably equal to or more than the maximum height h of the opening in the window portion 31a.

As illustrated in FIG. 5, after coating the negative electrode mixture slurry and the insulating layer slurry, through a presswork step S104 and a slit processing step S105 after drying, the above-described negative electrode 32 having the shape illustrated in FIG. 3 and FIG. 4 is produced.

For the positive electrode 34, 10 pts. wt. of scaly graphite as a conductive material and 10 pts. wt. of PVDF as a binder were added to 100 pts. wt. of lithium manganate (chemical formula: $LiMn_2O_4$) and NMP was added to the product as a dispersing solvent to manufacture a mixed positive electrode mixture slurry. The positive electrode mixture slurry was applied and dried with welding portions (positive electrode foil exposed portions 34b) remained on both surfaces of an aluminum foil (positive electrode foil). Afterwards, similarly to the above-described negative electrode, through the presswork and slit steps, the positive electrode 34 in which a positive electrode active material applied portion having a thickness of 100 to 200 μm without containing the aluminum foil was obtained.

While the embodiment has described the example of using the lithium manganate as the positive electrode active material, another lithium manganate having a spinel crystal structure, a lithium manganese composite oxide partially replaced by or doped with a metallic element, a lithium cobaltate and a lithium titanate having a layered crystal structure, or a lithium-metal composite oxide produced by replacing or doping a part of these substances by/with a metallic element may be used.

While the embodiment has described the case of using the PVDF as a binding material of the mixture layer applied portions in the positive electrode 34 and the negative electrode 32, for example, a polymer, such as polytetrafluoroethylene (PTFE), polyethylene, polystyrene, polybutadiene, butyl rubber, nitrile rubber, styrene butadiene rubber, polysulfide rubber, nitrocellulose, cyanoethyl cellulose, various kinds of latexes, acrylonitrile, vinyl fluoride, vinylidene fluoride, propylene fluoride, chloroprene fluoride, and acrylic-based resin, and a mixture of these substances are usable.

Among both end portions in the width direction of the wound group 3, that is, in the winding center axis W direction perpendicular to the winding direction, one side is configured as the laminated portion of the positive electrode 34, and the other side is configured as the laminated portion of the negative electrode 32. The laminated portion of the positive electrode 34 disposed on the one end is the positive electrode foil exposed portion 34b where the positive electrode mixture layers 34a are not formed is laminated. The laminated portion of the negative electrode 32 disposed on the other end is the negative electrode foil exposed portion 32b where the negative electrode mixture layers 32a are not formed is laminated. The laminated portion of the positive electrode foil exposed portion 34b and the laminated portion of the negative electrode foil exposed portion 32b are each preliminarily squashed and respectively coupled to the positive electrode current collector 180 and the negative electrode current collector 190 on the lid assembly 107 by ultrasonic joining, thus forming an electrode group assembly.

The use of the embodiment allows visually recognizing the position of the negative electrode mixture layer 32a; therefore, while the positions of the positive electrode mixture layer 34a and the negative electrode mixture layer 32a are accurately adjusted during winding, the respective layers can be laminated. In the coating step, also in the case where the other one surface is coated after coating one surface, the widths and the positions of the mixture layers on the front and back can be accurately adjusted, thereby ensuring providing a highly reliable lithium ion secondary battery.

While the embodiments of the present invention have been described in detail above, the present invention is not limited to the above-described embodiments and can be subjected to various kinds of design changes without departing from the spirit of the present invention described in the claims. For example, the above-described embodiments have been described in detail for ease of understanding of the present invention and are not necessarily limited to one that includes all the described configurations. A part of the configuration in one embodiment can be replaced by a configuration in another embodiment, and the configuration in another embodiment can be added to the configuration in one embodiment. Further, addition, omission, and replacement of another configuration can be performed on a part of the configuration in each embodiment.

REFERENCE SIGNS LIST

1 Battery can
3 Winding group
6 Battery lid
31 Insulating layer
31a Window portion
32 Negative electrode
32a Negative electrode mixture layer
32b Negative electrode foil exposed portion
33 Separator
34 Positive electrode
34a Positive electrode mixture layer
34b Positive electrode foil exposed portion
35 Separator
38 Coating dryer
40 Die head
41 Drying furnace
42 Unwind roller
43 Conveyance roller
44 Roll-up roller
45 Copper foil
46 Back roll
47 Outlet-side block
471 Insulating layer slurry manifold
472 Distal end surface
48 Shim
481 Depressed groove
484 Depressed groove
485 Distal end surface
49 Inlet-side block
491 Negative electrode mixture slurry manifold
52 Groove
100 Square secondary battery

The invention claimed is:

1. A secondary battery comprising an electrode, the electrode comprising:
   a strip-shaped metal foil having a first surface and a second surface;
   a first mixture layer and a second mixture layer formed on the first surface and the second surface, respectively;
   a metal foil exposed portion, of the metal foil, the metal foil exposed portion being exposed from the first mixture layer and the second mixture layer and disposed at in an end portion of the metal foil on one side in a width directions;
   a first insulating layer and a second insulating mixture layer disposed on the first mixture layer and the second mixture layer, respectively, and on the metal foil exposed portion,
   wherein the first insulating layer includes a first window portion, a first coated portion, and a second coated portion, the first window portion being interposed between the first coated portion and the second coated portion at a position corresponding to a boundary part between the first mixture layer and the metal foil exposed portion such that an end portion of the first mixture layer is visually recognizable through the first window portion.

2. The secondary battery according to claim 1, wherein the first window portion has an opening and the end portion of the first mixture layer is exposed from the opening.

3. The secondary battery according to claim 2, wherein the first window portion is continuously disposed along the end portion of the first mixture layer.

4. The secondary battery according to claim 2, wherein the first window portion includes a plurality of window portions discontinuously disposed along the end portion of the first mixture layer.

5. The secondary battery according to claim 1, wherein the second coated portion of the first insulating layer is coated over the metal foil and has a thickness thicker than a thickness of the first coated portion.

6. The secondary battery according to claim 1, wherein the first window portion has a transparent thin film portion, the transparent thin film portion having a thickness that is thinner than another part of the first insulating layer laminated on the first mixture layer such that the end portion of the first mixture layer is visually recognizable through the thin film portion.

7. The secondary battery according to claim 6, wherein the first window portion is continuously disposed along the end portion of the first mixture layer.

8. The secondary battery according to claim 6, wherein the first window portion includes a plurality of window portions discontinuously disposed along the end portion of the first mixture layer.

9. The secondary battery according to claim 1, wherein the second insulating layer includes a second window portion, a third coated portion, and a fourth coated portion, the second window portion being interposed between the third coated portion and the fourth coated portion at a position corresponding to a boundary part between the second mixture layer and the metal foil exposed portion such that an end portion of the second mixture layer is visually recognizable through the second window portion.

* * * * *